(12) United States Patent
Indersie et al.

(10) Patent No.: US 9,482,184 B2
(45) Date of Patent: Nov. 1, 2016

(54) ROCKET MOTOR COMBUSTION CHAMBER INJECTION HEAD

(75) Inventors: Dominique Jean Etienne Indersie, Vernon (FR); Julien Bachelet, Bernecourt (FR); Olivier Delahaye, Oissel (FR)

(73) Assignee: SNECMA, Paris (FR)

( * ) Notice: Subject to any disclaimer, the term of this patent is extended or adjusted under 35 U.S.C. 154(b) by 645 days.

(21) Appl. No.: 13/989,081

(22) PCT Filed: Nov. 14, 2011

(86) PCT No.: PCT/FR2011/052629
§ 371 (c)(1),
(2), (4) Date: Aug. 22, 2013

(87) PCT Pub. No.: WO2012/069728
PCT Pub. Date: May 31, 2012

(65) Prior Publication Data
US 2013/0318943 A1    Dec. 5, 2013

(30) Foreign Application Priority Data
Nov. 23, 2010   (FR) ..................... 10 59635

(51) Int. Cl.
*F02K 9/60* (2006.01)
*F02K 9/42* (2006.01)
*F02K 9/44* (2006.01)
*F02K 9/52* (2006.01)
*F02K 9/00* (2006.01)

(52) U.S. Cl.
CPC . *F02K 9/60* (2013.01); *F02K 9/42* (2013.01); *F02K 9/44* (2013.01); *F02K 9/52* (2013.01); *F02K 9/00* (2013.01)

(58) Field of Classification Search
CPC .............. F02K 9/42; F02K 9/44; F02K 9/52; F02K 9/60; F02K 9/64; F02K 9/972
See application file for complete search history.

(56) References Cited

U.S. PATENT DOCUMENTS

| 3,242,670 | A | * | 3/1966 | Buswell | F02K 9/52 60/258 |
| 4,621,492 | A | * | 11/1986 | von Pragenau | F02K 9/52 239/132.5 |
| 5,660,039 | A | * | 8/1997 | Sion | F02K 9/52 239/424 |
| 5,787,702 | A | * | 8/1998 | Tiedtke | F02K 9/52 60/257 |
| 5,983,626 | A | * | 11/1999 | Stahn | F02K 9/52 239/562 |
| 6,216,466 | B1 | * | 4/2001 | Alkabie | F23C 7/004 60/746 |
| 6,244,041 | B1 | * | 6/2001 | Vasin | F02K 9/52 60/258 |
| 7,895,823 | B2 | * | 3/2011 | Sciorelli | F02K 9/64 60/266 |
| 8,001,793 | B2 | * | 8/2011 | Patel | B23P 6/005 60/752 |

OTHER PUBLICATIONS

International Search Report Issued Mar. 26, 2012 in PCT/FR11/52629 Filed Nov. 14, 2011.

* cited by examiner

*Primary Examiner* — Lorne Meade
(74) *Attorney, Agent, or Firm* — Oblon, McClelland, Maier & Neustadt, L.L.P.

(57) ABSTRACT

An injection head including an annular distribution cavity for distributing a propellant upstream from an injection plate supporting injectors. The cavity includes a multiply-perforated distribution grid distributing the propellant, which grid is coaxial with the distribution cavity and of a concave shape that projects into the distribution cavity, the grid being fastened to a dome of the cavity.

12 Claims, 5 Drawing Sheets

ROCKET MOTOR COMBUSTION CHAMBER INJECTION HEAD

BACKGROUND OF THE INVENTION

1. Field of the Invention

The invention relates to an injection head for a rocket engine combustion chamber the injection head comprising a propellant feed duct, an annular cavity for distributing the propellant and into which the feed duct opens out, and an injection plate closing a face of the distribution cavity, the injection plate having holes pierced therein for receiving injectors in order to inject the propellant into the combustion chamber of the engine. The invention relates more particularly to distributing the propellant within the injection head prior to injecting the propellant into the combustion chamber. The invention applies in particular to the field of rocket-engine combustion chambers, regardless of whether they are for providing propulsion or form part of a gas generator or of a prechamber, both for civilian and military purposes.

In an injection head of the above type, it is necessary to provide good distribution of the first propellant, which is as uniform as possible over the entire injection plate in order to ensure good mixing between the two propellants, and thus in order to obtain better combustion.

2. Description Of The Related Art

Nevertheless, in most circumstances, propellant is fed into the distribution cavity from the periphery of the cavity, which means that the injectors situated at the periphery are often favored to the detriment of centrally-located injectors. Large differences of pressure or flow rate are then observed between the outside and the center of the injection plate.

In order to remedy that problem, various solutions are conventionally implemented for achieving good propellant distribution. This function may thus be performed by having an appropriate shape for the distribution cavity or by installing continuously-varying volutes within the cavity.

Nevertheless, such solutions are expensive, not very practical, and sometimes not very effective. By way of example, providing an appropriate shape for the cavity is complex and leads to numerous mechanical and thermal constraints that require thick structures to be installed, which structures are therefore heavy: this excess structural mass naturally leads to significant extra cost in use. The use of volutes requires fabrication methods that are complex and therefore expensive.

BRIEF SUMMARY OF THE INVENTION

The present invention makes it possible to solve all of those problems.

More particularly, the invention provides an injection head for a rocket engine combustion chamber, the injection head comprising: a feed duct for feeding a propellant; a distribution cavity for the propellant, the cavity being annular and having the feed duct opening out therein; and an injection plate closing a face of the distribution cavity, the injection plate having holes pierced therein for receiving injectors in order to inject the propellant into the combustion chamber; the injection head being characterized in that it further includes a multiply-perforated distribution grid for distributing the propellant, which grid is annular and coaxial with the distribution cavity, is concave in shape, projecting into the distribution cavity, is fastened to the dome of the cavity, and is interposed in the stream of propellant between the feed duct and the injection plate.

This grid that is pressed against the dome of the distribution cavity, i.e. the top of the dome or its portion facing the injection plate, possesses edges that are in contact at all points with the wall of the dome. Because of its concave shape with its concave side facing towards the dome, the grid projects into the inside of the cavity from the wall of the dome: a channel is thus defined between the inside wall of the grid and the wall of the dome. The propellant feed duct opens out into this channel: the propellant is then distributed throughout the channel, i.e. over 360° above the injection plate. The multiple perforations then allow the propellant to pass from the channel to the distribution cavity all along the distribution grid: the propellant is thus introduced into all of the cavity via a large number of points, thereby achieving much better uniformity within the cavity and thus, after injection, achieving better combustion, as intended.

Advantageously and preferably, with uniform distribution now being provided by the grid, it is possible to give the dome of the cavity a shape that is more ideal, e.g. semi-toroidal. In this specification, the term "torus" is used to designate a shape that is generated by rotating a circle, an ellipse, or any other substantially elliptical outline around an axis. Under such circumstances, a semi-toroidal shape is the form of such a torus cut in half on a plane that is substantially perpendicular to the axis of the torus. This shape, which can now be symmetrical, gives much better control over mechanical and thermal stresses: it is therefore possible to lighten the structures.

Preferably, the perforations in the distribution grid are not uniform so as to control the distribution of propellant within the channel and its introduction into the cavity.

In a simple technique, the section of the orifices varies over the surface of the grid and may advantageously increase on going further away from the feed duct.

In another simple technique that may be combined with the preceding technique, the density of the orifices may vary over the surface of the grid and may advantageously increase on going further away from the feed duct.

Preferably, the section of the distribution grid is constant. However, it may also vary: in which case its section advantageously decreases on going further away from the feed duct.

In advantageous and preferred manner, the feed duct is positioned in the neighborhood of the top of the dome of the cavity and is substantially perpendicular thereto.

In another embodiment, the feed duct is positioned off-center on the dome of the cavity and forms an angle of about 15° to 20° with the main axis of the injection head.

The shape of the distribution grid is preferably semi-toroidal.

Independently, the invention also provides a rocket engine including such an injection head.

BRIEF DESCRIPTION OF THE SEVERAL VIEWS OF THE DRAWINGS

The invention can be better understood and other advantages thereof appear more clearly in the light of the following description of an injection head in accordance with the principle of the invention, given purely by way of example and made with reference to the accompanying drawings, in which.

DETAILED DESCRIPTION OF THE INVENTION

Figure 1:
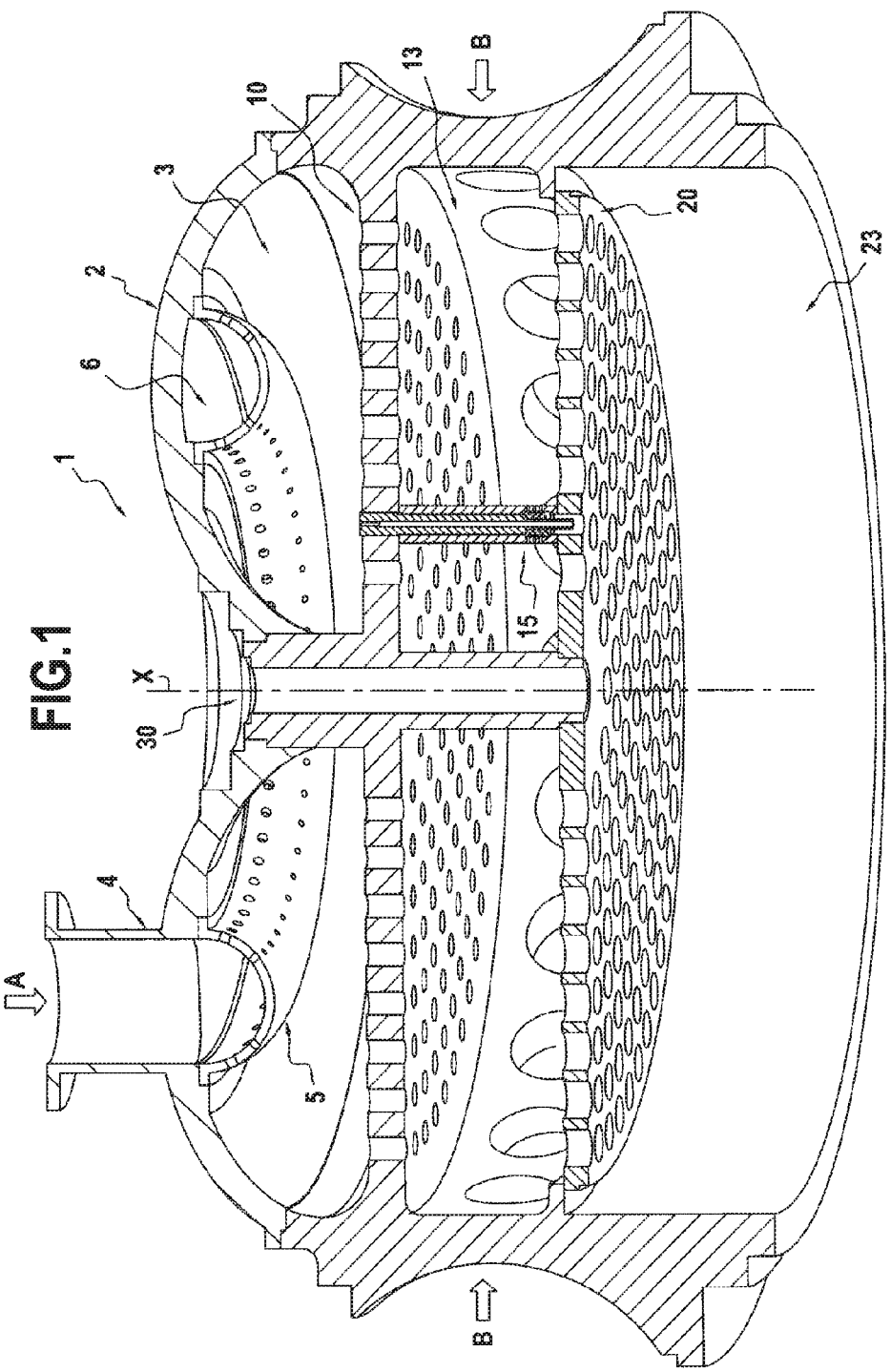
FIG. 1 is a perspective view of an injection head of the invention shown in axial section on a plane containing the feed duct for a first propellant.

FIG. 1 is a section view of an injection head 1 of a combustion chamber of a rocket engine in accordance with a preferred embodiment of the present invention.

This injection head 1 is of generally substantially cylindrical shape with a high degree of cylindrical symmetry about its longitudinal central axis X, it is closed at its top end by a dome 2 of substantially semi-toroidal shape, and it is open at its bottom end to the combustion chamber of the rocket engine. In this embodiment, the dome is of a semi-toroidal shape that is generated by rotating a half-ellipse about the central axis X, with the major axis of the half-ellipse being substantially perpendicular to the central axis X.

First and second injection plates 10 and 20 are located inside the injection head 1 over its entire section, occupying respective planes that are orthogonal to the central axis X.

The injection head 1 is also pierced longitudinally on its central axis so as to form a duct 30 extending from the dome 2 to the second injection plate 20, thus passing through the first injection plate 10, this duct serving to pass an ignition rod (not shown) for igniting the mixture of propellants at the outlet from the second injection plate 20.

The first and second injection plates 10 and 20 define three cavities within the injection head. An annular first cavity 3 is defined between the dome 2 and the first injection plate 10, and constitutes the cavity for distributing the first propellant A. An annular second cavity 13 defined between the first injection plate 10 and the second injection plate 20 is the cavity for distributing the second propellant B. A third cavity 23 defined at its top by the second injection plate 20 and open at its bottom constitutes the top portion of the combustion chamber.

Figure 2:
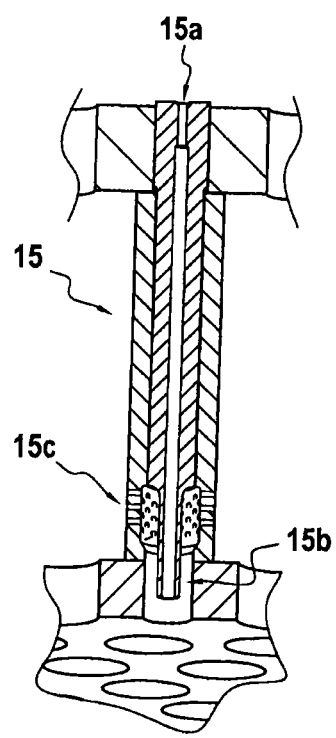
FIG. 2 is a detail view in section and on a larger scale of an injector of the injection head.

The first and second injection plates 10 and 20 are pierced by the same number of multiple through orifices, each hole in the second injection plate 20 facing a hole in the first injection plate 10. An injector 15 is fastened between each pair of orifices as formed in this way (to make FIG. 1 more readable, only one injector is shown). FIG. 2 shows that each injector 15 possesses a first axial duct 15a communicating with the distribution cavity 3 for distributing the first propellant A and with the top portion of the combustion chamber 23, and a peripheral second duct 15b that communicates with the distribution cavity 20 for distributing the second propellant B via small orifices 15c and also with the top portion of the combustion chamber 23.

In normal operation, the first propellant A, frequently liquid dioxygen, is admitted into the distribution cavity 3 for the first propellant A via a feed duct 4 for the first propellant A in which it becomes distributed in uniform manner as a result of the multiply-perforated distribution grid 5 that operates in a manner described in greater detail below. It then penetrates into the central duct 15a of each injector 15. The second propellant B, frequently liquid dihydrogen, is admitted into the distribution cavity 13 for the second propellant B via a plurality of orifices distributed in the peripheral wall of the distribution cavity 13 for distributing the second propellant B. The second propellant B becomes uniformly distributed therein and penetrates via the small holes 15c into the peripheral duct 15b of each injector 15. The first and second propellants A and B then escape from the injectors 15 in a geometrical configuration such that mixing between them is enhanced in order to enable combustion.

For combustion to be effective, it is necessary for the distribution of propellants in all of the injectors 15 to be uniform: this is the result of good distribution in each of the distribution cavities 3 and 13. This uniform distribution in the distribution cavity 3 for the first propellant A is provided by the multiply-perforated distribution grid 5 for the propellant A. This grid 5 is of generally annular shape, being concave and semi-toroidal, and it is fastened to the dome 2 of the cavity 3, and more particularly to the top of the dome 2, in coaxial manner so that the feed duct 4 for the first propellant A opens out between the grid 5 and the dome 2: it then projects into the distribution cavity 3 and thus forms a channel 6 between its inside wall and the wall of the dome 2. Since its side edges are in contact at all points with the dome 2, it is fully interposed in the stream of propellant A between the feed duct 4 and the first injection plate 10: since the propellant A feed duct 4 opens out into this channel 6, the propellant is distributed throughout the channel over 360° above the injection plate. The multiple perforations then enable the propellant to pass from the channel 6 to the distribution cavity all along the distribution grid: the propellant is thus introduced into all of the cavity via a large number of points, thereby ensuring good uniformity within the cavity and thus, after injection, better combustion, as intended.

Figure 3:
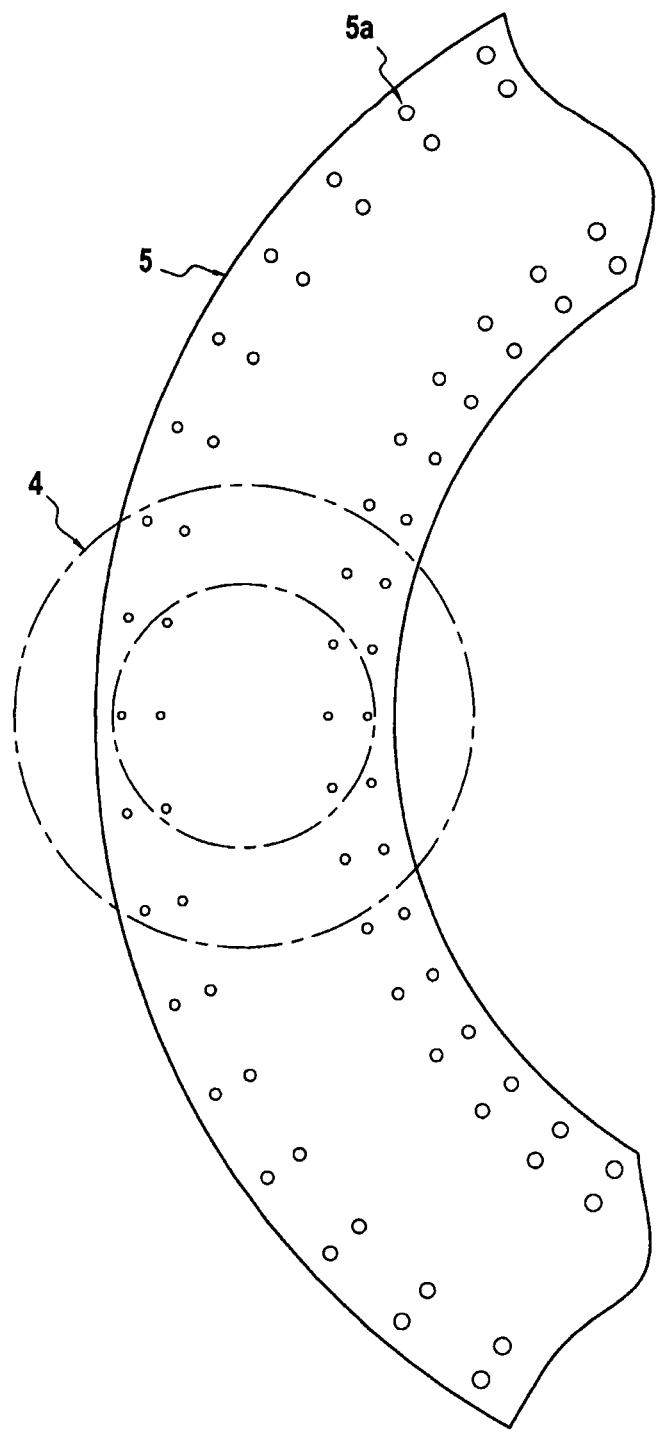
FIG. 3 is a fragmentary view showing the propellant distribution grid in an advantageous embodiment.
Figure 4:
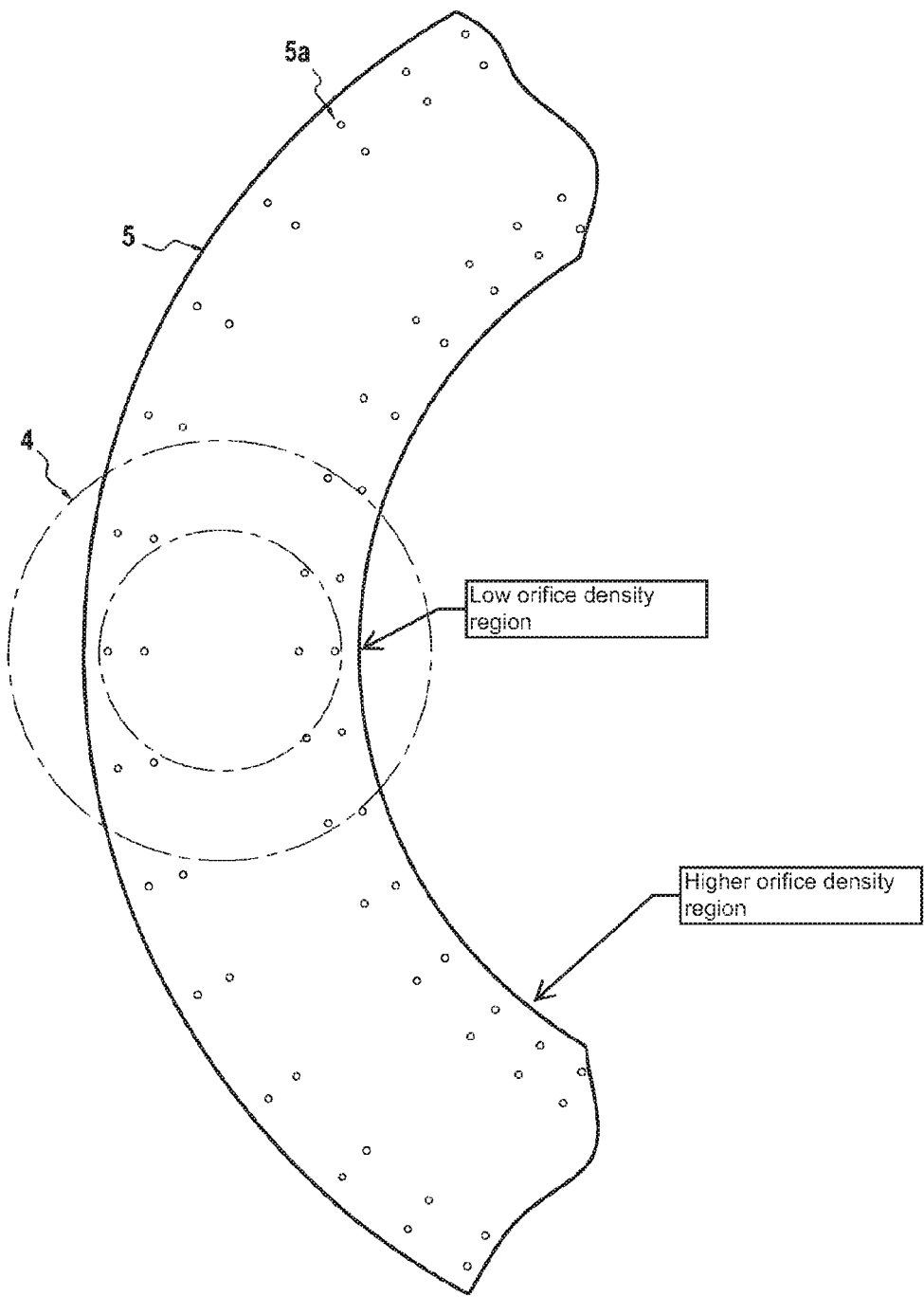
FIG. 4 is a fragmentary view showing another embodiment of the propellant distribution grid.

In order to ensure better distribution of the propellant A, the distribution arid 5 is advantageously perforated in non-uniform manner, thereby enhancing in particular complete filling of the channel 6. In a preferred embodiment, as shown in FIG. 3, the section of the orifices 5a in the distribution arid 5 increases perceptibly on going further away from the feed duct 4. It another possibility, as shown in FIG. 4, that may be independent of the preceding possibility or that may be combined therewith, the density of the orifices may vary, e.g. becoming perceptibly greater on going further from the feed duct.

Figure 5:
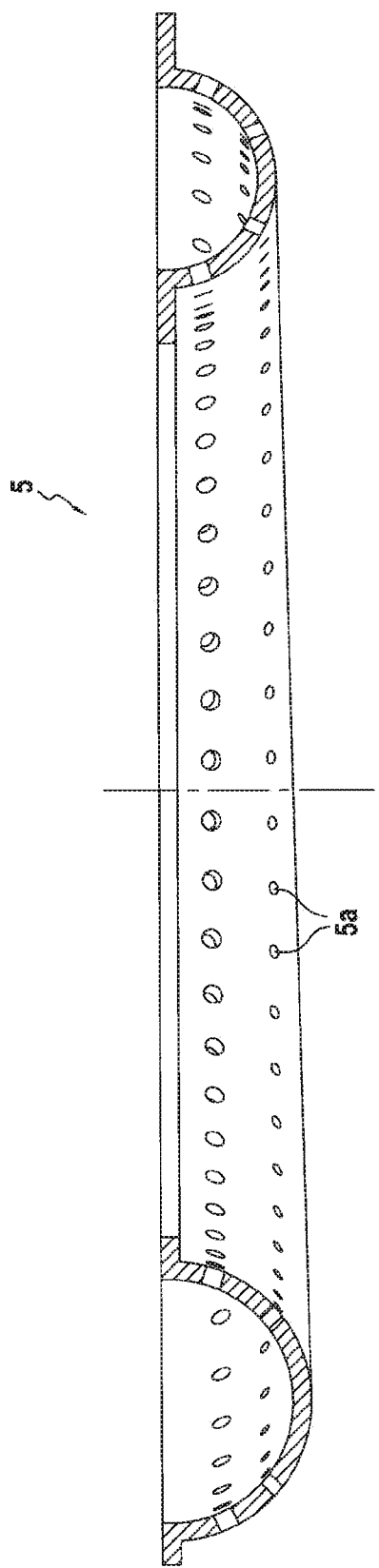
FIG. 5 is perspective view showing an embodiment of the propellant distribution grid.

In the embodiment shown in FIG. 1, the sec ion of the distribution grid 5 is constant, however in another embodiment shown in FIG 5, it may vary and decrease perceptibly on going away from the feed duct.

Advantageously, the first propellant A feed duct 4 is positioned close to the top of the dome 2 and substantially perpendicularly relative thereto: this position enables the dome 2 to have a shape that is better adapted to having good control over thermal and mechanical stresses.

Figure 6:
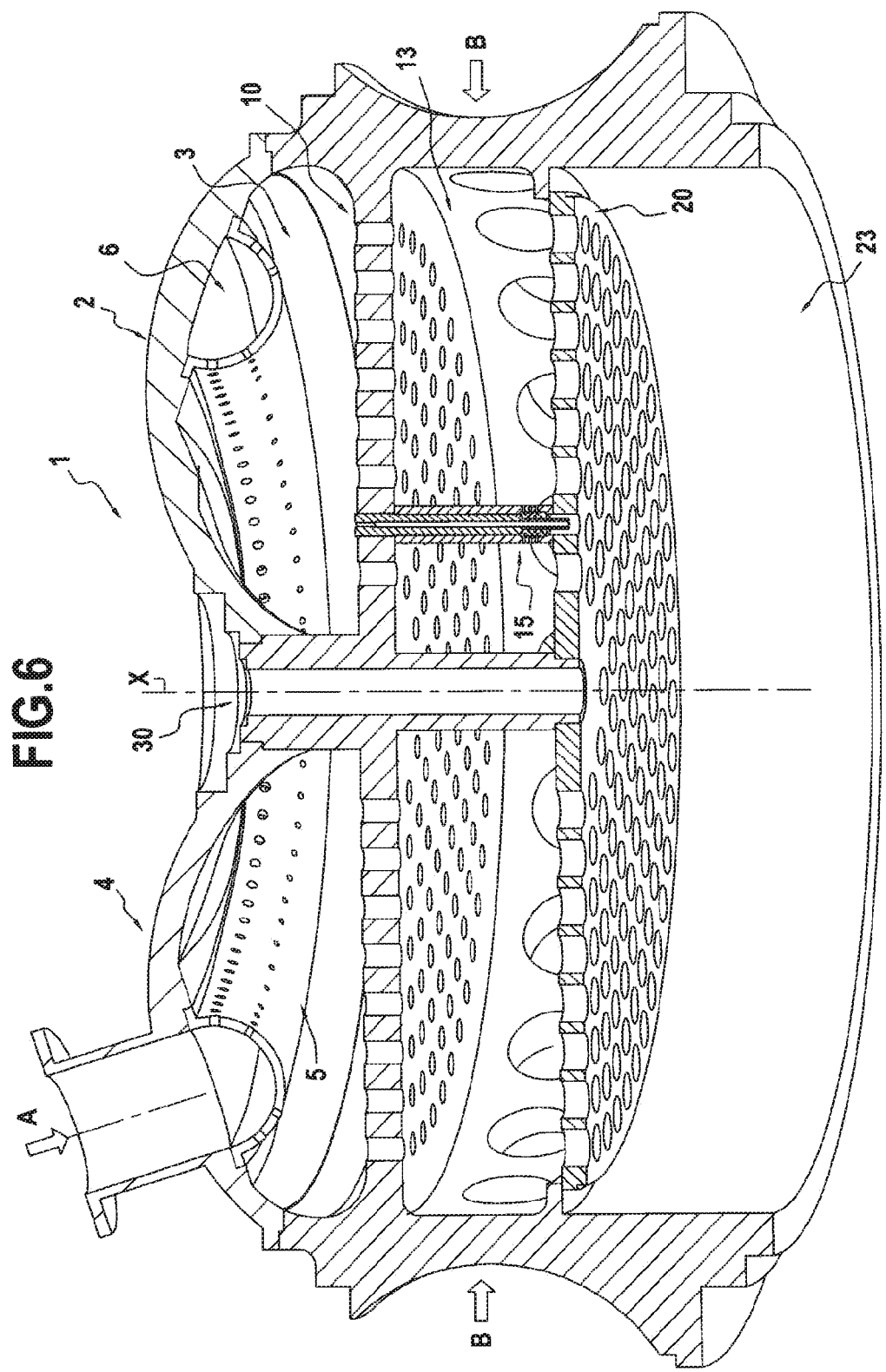
FIG. 6 is a perspective view of another embodiment of an injection head of the invention shown in axial section on a plane containing the feed duct for a first propellant.

In another embodiment shown in FIG. 6, the first propellant A feed duct 4 is somewhat off-center towards the periphery of the dome 2, e.g. forming an angle of about 15° to 20° relative to the perpendicular at the top of the dome 2.

The invention claimed is:

1. An injection head for a rocket engine combustion chamber, the injection head comprising:
   a substantially semi-toroidal shaped dome having a longitudinal central axis, the substantially semi-toroidal shaped dome generated by rotating a half-ellipse about the longitudinal central axis;
   a single feed duct for feeding a propellant;

a distribution cavity for the propellant, the distribution cavity being annular and coaxial with the longitudinal central axis;

an injection plate including holes pierced therein for receiving injectors to inject the propellant into the rocket engine combustion chamber, the substantially semi-toroidal shaped dome and the injection plate enclosing the distribution cavity; and a multiply-perforated distribution grid for distributing the propellant through multiple orifices, the distribution grid is annular, substantially semi-toroidal in shape and coaxial with the longitudinal central axis, the distribution grid projects into the distribution cavity with a concave shape, the distribution grid is fastened to a top inner surface of the substantially semi-toroidal shaped dome forming an annular propellant channel between the top inner surface and the distribution grid, the single feed duct opening out into the annular propellant channel, and the distribution grid is interposed in a stream of the propellant between the single feed duct and the injection plate.

2. An injection head according to claim 1, wherein the distribution grid is perforated in a non-uniform manner.

3. An injection head according to claim 2, wherein a flow area of the orifices varies over a surface of the grid.

4. An injection head according to claim 3, wherein the flow area of the orifices increases going further away from the feed duct.

5. An injection head according to claim 2, wherein density of the orifices varies over a surface of the grid.

6. An injection head according to claim 5, wherein the density of the orifices increases going away from the feed duct.

7. An injection head according to claim 1, wherein the distribution grid is of constant cross-sectional flow area.

8. An injection head according to claim 1, wherein the distribution grid is of varying cross-sectional flow area.

9. An injection head according to claim 8, wherein the cross-sectional flow area of the distribution grid diminishes going away from the feed duct.

10. An injection head according to claim 1, wherein the feed duct is positioned on a top of the dome of the distribution cavity and is substantially perpendicular to the top of the dome.

11. An injection head according to claim 1, wherein the feed duct is positioned in off-center manner on the dome of the distribution cavity relative to a perpendicular to a top of the dome and the feed duct forms an angle of about 15° to 20° with the perpendicular to the top of the dome.

12. A rocket engine comprising an injection head according to claim 1.

* * * * *